United States Patent [19]

Reich et al.

[11] 3,925,490

[45] Dec. 9, 1975

[54] HYDROGENATION CATALYSTS AND PROCESS FOR THE REMOVAL OF ALDEHYDES AND KETONES FROM GASEOUS STREAMS RICH IN CARBON MONOXIDE

[75] Inventors: Manfred Reich; Wolfgang Müller; Manfred zur Hausen, all of Marl, Germany

[73] Assignee: Chemische Werke Huls aktiengesellschaft

[22] Filed: July 13, 1970

[21] Appl. No.: 54,589

[30] Foreign Application Priority Data

July 15, 1969 Germany............................ 1935900

[52] U.S. Cl............. 260/643 B; 252/373; 252/457; 252/458; 252/465; 252/467; 252/470; 260/638 B; 260/638 HF; 423/245; 423/415
[51] Int. Cl.² ........................................ C07C 29/14
[58] Field of Search ...... 260/643 B, 638 B, 638 HF; 23/204 M

[56] References Cited

UNITED STATES PATENTS

| | | | |
|---|---|---|---|
| 2,042,314 | 5/1936 | James............................ | 260/638 B |
| 2,044,414 | 6/1936 | Wilkinson.......................... | 260/641 |
| 2,595,096 | 4/1952 | Parker........................... | 260/638 HF |
| 2,638,487 | 5/1953 | Russum et al................. | 260/638 HF |
| 2,743,302 | 4/1956 | Gwynn et al................. | 260/638 HF |
| 3,118,954 | 1/1964 | Robbins et al................ | 260/638 HF |
| 3,491,158 | 1/1970 | Reich............................ | 260/638 B |
| 3,491,159 | 1/1970 | Reich et al...................... | 260/638 B |

*Primary Examiner*—Joseph E. Evans
*Attorney, Agent, or Firm*—Gilbert L. Wells

[57] ABSTRACT

Aldehydes and ketones contained in gaseous streams rich in carbon monoxide, such as produced in the Oxo process, are selectively hydrogenated to alcohols on copper/chromium supported catalysts.

11 Claims, No Drawings

HYDROGENATION CATALYSTS AND PROCESS FOR THE REMOVAL OF ALDEHYDES AND KETONES FROM GASEOUS STREAMS RICH IN CARBON MONOXIDE

CROSS-REFERENCES TO RELATED APPLICATIONS

Applicants claim priority under 35 U.S.C. 119 for Application P 19 35 900.3, filed July 15, 1969 in the Patent Office of the Federal Republic of Germany.

The copending application of the common assignee of the present invention entitled "Catalytic Splitting of Formic Acid Esters on Hydrogenation Catalysts", filed Oct. 20, 1969, having the Ser. No. 867,914, and now abandoned, is incorporated herein. Application Ser. No. 867,914 discloses the new and unexpected results obtained by using copper/nickel supported catalysts in the hydrogenation step of the Oxo process.

BACKGROUND OF THE INVENTION

The field of the invention is chemistry, purification or recovery of acyclic compounds. The invention is particularly concerned with the conversion of the aldehydes and ketones produced in the Oxo process to alcohols by selective catalytic hydrogenation.

The state of the art of the Oxo process may be ascertained by reference to the Kirk-Othmer "Encyclopedia of Chemical Technology", 2nd Ed., Vol. 14 (1967), under the section "Oxo Process", pages 373-390, particularly pages 382, 384 and 385. Kirk-Othmer discloses in FIG. 4 appearing on page 382 a schematic diagram of the Oxo process, and on pages 384 and 385 the state of the art of the hydrogenation process is disclosed. The state of the United States patent art may be ascertained by reference to U.S. Pat. No. 3,462,500 of Tummes et al., which issued Aug. 15, 1969. The patent of Tummes et al. discloses a process for purifying alkanols prepared by the Oxo reaction. Incorporated within the disclosure of U.S. Pat. No. 3,462,500 are the disclosures of U.S. Pat. No. 2,779,794, German Published Specifications 1,108,195, 1,148,221, and British Patent 825,359.

In disclosing the hydrogenation step of the Oxo process, Kirk-Othmer, supra, points out at pages 384 and 385 that the alcohol Oxo products are produced from the crude or semi-refined products by a conventional hydrogenation process. The lower alcohols are sometimes prepared by the hydrogenation of pure aldehydes. When vapor phase hydrogenation is used, the organic feed is vaporized into a large volume of hydrogen and passed over the catalyst bed. The vapor phase process operates at low pressures and temperatures from 50° to 200°C. The preferred catalysts are nickel, cobalt and molybdenum sulfide. The metallic catalysts are normally prepared on an inert support such as kieselguhr, alumina or silica, and other metals may be present as promoters. The catalysts are quite often charged to the hydrogenation chamber in the form of metal oxides and the oxides are later reduced in place by hydrogen to the metals.

The Oxo process involves the catalytic reaction of carbon monoxide and hydrogen with an olefin, such as propylene, to aldehydes, such as n- and isobutyraldehyde. A gas rich in carbon monoxide is obtained as the expansion gas or also during the course of the subsequent working-up procedure, and this gas still contains aldehydes and/or ketones. These organic compounds are very troublesome in the event that the carbon monoxide-containing gaseous mixture is to be further used, since they readily form contaminants by polymerizations, or also form, in the presence of small amounts of air, acids having a foul odor. On the other hand, the carbon monoxide must not be affected, if at all possible, if it represents the substance which is to be further utilized.

Since the aldehydes and ketones are, in most cases, hydrogenated to the corresponding alcohols, the opportunity presents itself to subject also this carbon monoxide rich gaseous mixture to a catalytic hydrogenation.

However, insurmountable difficulties seem to stand in the way of accomplishing this task.

Carbon monoxide impairs the hydrogenating effect of the ordinary heavy metals employed as the catalysts and, when present in larger concentrations, can bring the hydrogenation almost completely to a standstill. This is disclosed, for example, in "Handbuch der Katalyse" Vienna, G. -M. Schwab Publishers, Vol. V (1957), 277–279; Vol VI (1943), 247, 254 and 255, describing, in particular, the poisonous effect of carbon monoxide on copper catalysts. Although an attempt can be made to compensate for the impairment of the hydrogenating effect by elevating the hydrogenation temperature, the hydrogenation effect then becomes so great that the carbon monoxide is attacked. For example, the hydrogenation to form methanol and further alcohols from carbon monoxide and hydrogen on a great variety of metallic and oxygen catalysts, such as copper, cobalt, iron, is conventional, "Ullmanns Encyclopaedie der technischen Chemie", Vol. 12, 420; Catalysis, Vol. III (P. H. Emmett Publishers), New York (1952), 349–411; likewise, it is known that carbon monoxide is hydrogenated to methane, especially on nickel-containing catalysts (Ullmann, Vol. 12 "Methanol").

Although, in the Oxo synthesis, a portion of the aldehyde produced therein is further hydrogenated to the alcohol in the presence of carbon monoxide (Catalysis, Vol. V, P. H. Emmett Publishers, New York, [1957], 83 et seq); J. Am. Chem. Soc. 72, 4375 (1950), very high partial hydrogen pressures are required in this process, or special conditions are necessary, such as the addition of complex-forming agents, such as phosphines or arsines (Journal of Organometallic Chem. 13 (1968), No. 2, 469–477). Furthermore, this hydrogenation takes place in the liquid phase, the catalyst - generally a cobalt compound - being present in the dissolved state.

Consequently, a selective catalytic hydrogenation of the organic compounds has not seemed possible in view of the state of the prior art.

SUMMARY OF THE INVENTION

Having in mind the limitations of the prior art, the problem faced by the present invention is to provide a simple process permitting hydrogenation of the impure aldehyde and ketone products of the Oxo process so that on the one hand valuable alcohols are obtained, but on the other hand carbon monoxide is not reacted.

An object of the present invention is to convert aldehydes and ketones into their respective alcohols by selective catalytic hydrogenation.

Another object of the present invention is to find a catalyst which will not be poisoned by contact with carbon monoxide at elevated reaction temperatures.

Still another object of the present invention is to provide a hydrogenation catalyst which does not react with carbon monoxide, so that the carbon monoxide in the gaseous stream is not diminished.

A particular object of the present invention is to improve upon the copper/nickel hydrogenation catalyst disclosed in application Ser. No. 867,914.

The problem presented to the applicants by the state of the art is solved according to the present invention by employing copper containing support catalysts. This supported metal catalyst comprises about 100 parts by weight of support material and about from 3 to 35 parts by weight of copper calculated as metal. A preferred embodiment of the catalyst contains copper and chromium. The chromium is 0.5 to 50 percent by weight of the copper proportion and the preferred concentration is 3 to 20 percent. In addition to the copper and chromium, it has been found that a particularly well suited catalyst contains nickel. The proportion of the nickel is 0.1 to 80 percent, and preferably 5 to 50 percent of the weight of the copper proportion, where the components, copper, chromium and nickel are calculated on the basis of the metal.

The hydrogenation step is preferably carried out in two stages, e.g. two tubes wherein the temperature range is 100° to 200°C and preferably 120° to 180°C, and the pressure range is 3 to 50 atmospheres, and preferably 5 to 30 atmospheres. The gas fed to the hydrogenation process contains approximately 50–60 percent by volume of hydrogen and 5 to 95 percent by volume of carbon monoxide. The concentration of aldehyde and ketone in the gas stream is about 5 to 60 grams per cubic meter at normal conditions. The preferred conditions of the hydrogenation process uses less than 250 grams of aldehyde per liter of catalyst.

Preferred examples of the overall combination of support material, copper, chromium and additives are, with proportions given in parts by weight, wherein the support material (kieselguhr, silica gel, aluminum oxide) contains the oxygen which may be combined chemically with the metals, whereas the metals are listed in the elemental form:

| | |
|---|---|
| Kieselguhr | 90.6 |
| Copper | 5. |
| Nickel | 4. |
| Chromium | 0.4; |
| Silica Gel | 87.3 |
| Copper | 9.2 |
| Nickel | 2.8 |
| Chromium | 0.4 |
| Potassium | 0.3; |
| Silica Gel | 80.6 |
| Copper | 14.0 |
| Nickel | 2.5 |
| Chromium | 2.0 |
| Calcium | 0.6 |
| Potassium | 0.3 |
| Silica Gel | 87.4 |
| Copper | 9.0 |
| Nickel | 3.0 |
| Chromium | 0.4 |
| Sodium | 0.2 |
| Silicic Acid Gel | 78.85 |
| Copper | 20.0 |
| Chromium | 1.0 |
| Sodium | 0.2 |
| Aluminum Oxide | 89.5 |
| Copper | 8.0 |
| Nickel | 2.0 |
| Chromium | 0.5 |
| Aluminum Oxide | 87.0 |
| Copper | 12.8 |
| Chromium | 0.2 |
| Silicic Acid Gel | 54 |
| Copper | 32 |
| Chromium | 14 |
| *-continued* | |
| Silicic Acid Gel | 51 |
| Copper | 33 |
| Chromium | 11 |
| Barium | 5 |
| Silica Gel | 76 |
| Copper | 15 |
| Chromium | 4 |
| Zinc | 5 |

DESCRIPTION OF THE PREFERRED EMBODIMENTS

Suitable supported catalysts are those containing, as the support materials, for example those based on silicic acid, such as silica gel, kieselguhr, precipitated or sintered silicic acid, or aluminum oxide, magnesium oxide, calcium carbonate, pumice, or meerschaum, in the form of broken pieces, pellets, or rods.

The copper, as the hydrogenation-active component, is applied to the support in a conventional manner, by saturating the support material with an aqueous or aqueous-ammoniacal, approximately 3–10 percent copper salt solution, such as copper nitrate, copper acetate, basic copper carbonate. In this connection, 3–35 parts by weight of copper— calculated as the metal— can be employed per 100 parts by weight of support.

The supported catalysts can also be prepared by precipitating the copper and the support together from a solution, for example by adding acids to an aqueous-ammoniacal solution of copper hydroxide and sodium silicate. In this connection, about 5–100 parts by weight of copper, calculated as the metal, is employed per 100 parts by weight of support.

Thereafter, the thus-obtained materials are optionally shaped, dried, and finally, reduced, usually in a hydrogen stream at an elevated temperature of about 100°–300°C.

In addition to the copper, the catalysts can contain customary modifiers, for example chromium or chromium compounds, phosphates, molybdates, magnesium or barium or compounds thereof, zinc or compounds thereof, cadmium or compounds thereof. Furthermore, additional hydrogenation active components can be present in addition to the copper, such as, for example, nickel, iron, cobalt, palladium, platinum, silver.

These modifiers or additional hydrogenation-active components are introduced in the form of salts, hydroxides, or oxides, soluble in water, which latter can optionally be ammoniacal or acidic, to improve the solubility. Preferably employed are supported catalysts containing copper and chromium. In these catalysts, the proportion of chromium is to be 0.5 – 50 percent of the copper proportion, preferably 3 – 20 percent, in each case calculated as the metal. Particularly well suitable are, surprisingly, catalysts containing in addition to copper and/or chromium also nickel, although a catalyst containing solely nickel as the hydrogenation-active component is completely unsuitable.

Such a catalyst is produced, for example, by applying an aqueous-ammoniacal solution of basic copper carbonate, chromic acid, and optionally nickel formate on silicic acid gel. In this connection, it is advantageous to add a small amount of sodium hydroxide.

The proportion of nickel is 0.1 – 80 percent, preferably 5 – 50 percent, of the copper proportion — both calculated as the metal.

Over one part by volume of such a catalyst, amounts of gas of about 500 – 10,000 parts by volume, based on normal conditions can be passed per hour. The hydrogenation temperature ranges advantageously between 100° and 200°C, especially between 120° and 180°C. The operating pressure can be chosen as desired, but a pressure of between 3 and 50 atmospheres, especially in the range of 5 – 30 atmospheres, is advantageous.

The gas consists of any desired mixtures of carbon monoxide and hydrogen, for example, it can contain between 5 and 60 percent by volume of carbon monoxide and between 5 and 95 percent by volume of hydrogen; furthermore, other inert gases, such as nitrogen, argon and carbon dioxide, and hydrocarbons, such as methane, ethane, ethylene, propane, propene, butane, and butene, can additionally be present.

The content of hydrogenatable aliphatic aldehydes having 3 to 8 carbon atoms, such as n-butyraldehyde, isobutyraldehyde, propionaldehyde, pentanal, hexanal, heptanal, octanal, and the isomers thereof, such as, for example, ethylhexanal, or also unsaturated aldehydes, such as, for example ethylhexenal, and/or aliphatic ketones having 3 to 7 carbon atoms, such as acetone, 2-butanone, pentanones, hexanones, heptanones, such as, for instance, 2-heptanone, 4-heptanone, 2-methyl-3-hexanone, 2,4-dimethyl-3-pentanone, are likewise optional, as long as the compounds are still in the gaseous phase under the hydrogenation conditions. In general, the contents of aldehyde or ketone will be approximately 5 – 60 g. per $Nm^3$ of gas. The product load on the catalyst is suitably to be selected so that it remains below about 250 g. of aldehyde or ketone per hour and liter of catalyst volume, since otherwise the conversion would not be satisfactory any more, in general.

Advantageously, the hydrogenation is conducted in several, for example two, partial stages; in between these stages, the principal amount of the alcohol produced is removed from the gaseous mixture. For best results, the hydrogenation is conducted in the presence of an excess of hydrogen of at least ten times the amount theoretically required for the hydrogenation.

The process of this invention is especially suitable for the removal of n- and isobutyraldehyde from the expansion gas containing carbon monoxide and hydrogen obtained downstream of the reactors in an Oxo plant wherein butyraldehyde is produced from propylene, carbon monoxide, and hydrogen.

Surprisingly, the removal of the aldehydes and ketones is effected, according to the invention, smoothly and in an economical manner, in the gaseous phase. The alcohols are, furthermore, more readily removed from the gaseous stream than the aldehydes or ketones, since they are higher boiling. Accordingly, they are readily removed, for example by condensation with water cooling or optionally with a refrigerant or by scrubbing. The alcohols are more stable chemically than aldehydes, so that traces thereof during the further processing steps generally do not produce a troublesome effect on the process. The especially valuable aspect of the process is that the carbon monoxide remains unreacted.

However, in the case where the gas which is rich in carbon monoxide is not intended for further chemical processing but, rather, is to be burned, for example, it is more advantageous from an economical point of view to obtain the alcohols from the gas as completely as possible by condensation or scrubbing out with appropriate solvents, rather than the corresponding aldehydes. If the hydrogenation according to the present invention was not carried out then the aldehydes would constitute the principal ingredients.

Without further elaboration, it is believed that one skilled in the art can, using the proceeding description, utilize the present invention to its fullest extent.

EXAMPLE 1

At a temperature of 150°C and an operating pressure of 15 atmospheres gauge, 50 g./h (grams per hour) of n-butyraldehyde which has previously been evaporated is conducted, together with 1000 Nl./h. (liters/hr at normal conditions) of hydrogen and 500 Nl./h. of carbon monoxide, over a catalyst filled into a first tube in the amount of 1 liter. Thereafter the product is condensed in a cooling system operated with water of about 10°–15°C.

The catalyst contains 9 percent by weight of copper, 3 percent by weight of nickel, 0.4 percent by weight of chromium, and 0.2 percent by weight of sodium on silica gel as the support material, and was produced by applying corresponding amounts of copper carbonate, nickel formate, chromic acid, and sodium hydroxide from an ammoniacal-aqueous solution to the support material, drying, and treating in a hydrogen stream at about 200°C.

The condensed n-butanol (49–50 g./h.) contains 0.05 percent by weight of aldehyde, calculated as butyraldehyde. The gaseous mixture discharged from the butanol condensation step consists of 66 percent by volume of hydrogen and 34 percent by volume of carbon monoxide; in other words, carbon monoxide has not been attacked, methane cannot be detected; besides, 1.2 g. of n-butanol and 20 mg. of n-butyraldehyde are contained in 1 $Nm^3$ (cubic meters at normal conditions) of the discharged gaseous stream.

This gaseous stream is thereafter conducted, at 140°C and 15 atmospheres gauge, through a second tube charged with 0.5 liter of a catalyst having the same composition. The discharged gaseous mixture likewise consists of 66 percent by volume of hydrogen and 34 percent by volume of carbon monoxide (no methane can be detected), and contains 1.2 g. of n-butanol; aldehyde cannot be detected (definitely below 5 mg. of butyraldehyde per $Nm^3$).

After an operating period of 700 hours, the activity and selectivity of the catalyst packings in the first and second tubes are practically unchanged and similar analysis data are obtained.

EXAMPLE 2 a. The hydrogenation is conducted in accordance with, and under the conditions of, Example 1, with the difference that a catalyst is used as the charge in both tubes containing 20 percent by weight of copper, 1 percent by weight of chromium, and 0.15 percent by weight of sodium on silicic acid gel. This catalyst was produced correspondingly by the application of aqueous salt solutions (copper nitrate, chromic acid, and sodium hydroxide), drying, and reduction.

The condensed n-butanol contains 0.07 percent by weight of aldehyde, calculated as butyraldehyde. The gaseous mixture discharged after the butanol condensation step consists of 66 percent by volume of hydrogen and 34 percent by volume of carbon monoxide. Furthermore, 1.3 g. of n-butanol and 40 mg. of n-butyraldehyde are contained per $Nm^3$ in the gaseous stream exiting after the first hydrogenation stage. The gaseous stream discharged after the second hydrogenation stage exhibits the same analytical data, with the exception that no aldehyde can be detected.

b. When employing isobutyraldehyde in place of n-butyraldehyde, isobutanol is obtained, with similar analytical data.

EXAMPLE 3

The hydrogenation is conducted in accordance with, and under the conditions of, Example 2(a), the difference being that 2000 Nl./h. of a gaseous mixture is introduced into the hydrogenation system containing 53 percent by volume of hydrogen, 30 percent by volume of carbon monoxide, 12 percent by volume of propylene, 3 percent by volume of propane, and 2 percent by volume of nitrogen.

The condensed n-butanol contains 0.08 percent by weight of aldehyde, calculated as butyraldehyde. The gaseous mixture discharged after the butanol condensation consists of 52 percent by volume of hydrogen, 31 percent by volume of carbon monoxide, 11 percent by volume of propylene, 4 percent by volume of propane, and 2 percent by volume of nitrogen; additionally, per $Nm^3$ of the gaseous stream discharged after the first hydrogenating stage, 1.2 g. of n-butanol and 30 mg. of n-butyraldehyde are present therein. The gaseous stream exiting after the second hydrogenation stage consists of 52 percent by volume of hydrogen, 31 percent by volume of carbon monoxide, 10 percent by volume of propylene, 5 percent by volume of propane, and 2 percent by volume of nitrogen; furthermore, 1.2 g. of n-butanol are still contained per $Nm^3$ of gas. Aldehyde cannot be detected (below 5 mg./$Nm^3$).

EXAMPLE 4 a. The hydrogenation is conducted in accordance with, and under the conditions of, Example 1, with the difference that the charge in the two tubes is a catalyst containing 8 percent by weight of copper, 2 percent by weight of nickel, 0.5 percent by weight of chromium, on aluminum oxide as the support material. The products obtained are n-butanol and gaseous streams having similar analytical data as in Example 1.

b. After adjusting the hydrogenation pressure is about 5 atmospheres gauge, similar results are obtained; the aldehyde contents in the condensed butanol and in the gaseous stream exiting after the first hydrogenation stage are slightly increased. No aldehyde content can be detected in the gaseous stream exiting after the second hydrogenation stage.

EXAMPLE 5

The hydrogenation is conducted in accordance with, and under the conditions of Example 1, with the difference that the starting material employed is 2-butanone in place of n-butyraldehyde. The product obtained is 2-butanol, containing 0.3 percent by weight of 2-butanone. In the exiting gaseous streams, practically no 2-butanone is contained.

EXAMPLE 6

An amount of gas of 6 $Nm^3$/h. is conducted over a catalyst as described in Example 1 and filled into a tube in the amount of 1 liter, with a gas temperature at the tube inlet of 135°C, which temperature increases in the interior of the tube to about 145°–150°C, due to the liberated heat of hydrogenation, and at an operating pressure of 17 atmospheres gauge. This amount of gas stems from the expansion gas of an Oxo plant and exhibits the following composition (calculated free of water and aldehyde):

46.2 percent by volume of hydrogen
28.3 percent by volume of carbon monoxide
3.0 percent by volume of nitrogen
1.3 percent by volume of methane
0.1 percent by volume of ethane
7.7 percent by volume of propene
13.1 percent by volume of propane
0.2 percent by volume of carbon dioxide and furthermore (in the vapor phase):

40 g./$Nm^3$ of n- and isobutyraldehyde
2 g./$Nm^3$ of water

Thereafter, the gaseous stream is cooled in a water cooling system, under pressure, to 15°–20°C, during which process butanol is separated by condensation (about 39–40 g./h. of n- and isobutanol).

The n- and isobutanol condensed thereby contains 0.05 percent by weight of butyraldehyde and 2 percent by weight of water. The gaseous stream exiting after the butanol condensation exhibits the following composition (calculated free of water and butanol):

45.5 percent by volume of hydrogen
28.7 percent by volume of carbon monoxide
3.0 percent by volume of nitrogen
1.3 percent by volume of methane
0.1 percent by volume of ethane
7.8 percent by volume of propene
13.3 percent by volume of propane
0.2 percent by weight of carbon dioxide and furthermore (in the vapor phase):

2 g./$Nm^3$ of butanol (n- and iso-)
1 g./$Nm^3$ of water
10 mg./$Nm^3$ of butyraldehyde (n- and iso-)

These analytical results did not change substantially after an operating period of 500 hours.

EXAMPLE 7

The hydrogenation is conducted according to, and under the conditions of, Example 1, with the difference that, as the charge in the two tubes, a catalyst is employed containing 10 percent by weight of nickel on silica gel as the support substance. The thus-obtained condensate consists of more than 90 percent of butyraldehyde; even after increasing the hydrogenation temperature to 180°C, no improvement in the hydrogenating effect can be obtained. When further elevating the temperature to 200°C and higher, considerable portions of carbon monoxide are hydrogenated to methane.

In contrast thereto, at a hydrogenation temperature of 150°C, in the absence of carbon monoxide, n-butanol is obtained from the n-butyraldehyde, with an aldehyde content of 0.1 percent.

EXAMPLE 8

(COMPARATIVE EXAMPLE)

When operating in accordance with, and under the conditions of, Example 1, but employing as the charge in both tubes a catalyst containing 15 percent of cobalt on silicic acid gel (produced by applying an aqueous cobalt nitrate solution and subsequent decomposition and reduction), the condensate consists of about 95 percent of butyraldehyde. Increasing the hydrogenation temperature has the same effect as described in Example 7. In the absence of carbon monoxide, n- butanol is obtained.

The preceding examples can be repeated with similar success by substituting the generically and specifically described reactants and operating conditions of this invention for those used in the preceding examples.

We claim:

1. In a process for the removal of alkanals and alkanones having 3 to 8 carbon atoms from gaseous streams obtained in the Oxo process rich with about 5 to 95 percent by volume of hydrogen, about 5 to 60 percent by volume of carbon monoxide and about 5 to 60 grams of said alkanals and alkanones per cubic meter at normal conditions, the improvement comprising hydrogenating said aldehydes and ketones to alkanols at a temperature of about 100° to 200°C, a pressure of about 3 to 50 atmospheres and in the presence of a supported metal catalyst comprising 100 parts support material by weight, about 5 to 100 parts by weight of copper and about 0.5 to 50 percent by weight of chromium based on the weight of the copper, said supported metal catalyst is prepared by precipitating salts of the copper and chromium from solution, drying the precipitated material and reducing the salts in a hydrogen stream at an elevated temperature of about 100° to 300°C.

2. The process according to claim 1, wherein the hydrogenation is conducted in the presence of an excess of hydrogen of at least ten times the amount theoretically required for the hydrogenation.

3. The process according to claim 2, wherein the hydrogenation is conducted in several partial stages, between which stages the principal amount of the alkanol produced is removed from the gaseous mixture.

4. The process according to claim 1, wherein the alkanol produced is obtained from the gaseous stream by condensation.

5. The process of claim 1, wherein the alkanol produced is obtained from the gaseous stream by scrubbing.

6. The process of claim 1, wherein said supported metal catalyst has a copper concentration of about 3 – 35 parts by weight.

7. The process of claim 6, wherein said supported metal catalyst has a chromium concentration of about 3 to 20 parts by weight of the copper concentration.

8. The process of claim 1, wherein said supported metal catalyst has a nickel concentration of about 0.1 to 80 percent by weight of the copper concentration.

9. The process of claim 7, wherein said supported metal catalyst has a nickel concentration of about 5 to 50 percent by weight of the copper concentration.

10. A process for the removal of n-butyraldehyde and isobutyraldehyde from the expansion gas of the Oxo process wherein butyraldehyde is produced from propylene, carbon monoxide and hydrogen and the expansion gas has about 5 to 60 grams of said n-butyraldehyde and isobutyraldehyde per cubic meter at normal conditions, about 5 to 95 percent by volume of said hydrogen, and about 5 to 60 percent by volume of said carbon monoxide, comprising hydrogenating said n-butyraldehyde to n-butanol and iso-butanol at a temperature of about 100° to 200°C, a pressure of about 3 to 50 atmospheres and in the presence of a supported metal catalyst comprising 100 parts of support material by weight, about 5 to 100 parts by weight of copper and about 0.5 to 50 percent by weight of chromium based on the weight of the copper, said supported metal catalyst is prepared by precipitating salts of the copper and chromium from solution, drying the precipitated material and reducing the salts in a hydrogen stream at an elevated temperature of about 100° to 300°C.

11. The process of claim 10, wherein the hydrogenation is carried out at a temperature of about 120° to 180°C, a pressure of about 5 to 30 atmospheres and about 500 to 10,000 parts by volume of said expansion gas are passed over one part by volume of said catalyst per hour.

* * * * *